United States Patent

[11] 3,575,207

| [72] | Inventors | John A. Denner<br>West Roxbury;<br>Robert D. Reis, Hingham, Mass. |
|---|---|---|
| [21] | Appl. No. | 765,423 |
| [22] | Filed | Oct. 7, 1968 |
| [45] | Patented | Apr. 20, 1971 |
| [73] | Assignee | United Electric Controls Company<br>Watertown, Mass. |

[54] PROPORTIONING VALVE
12 Claims, 11 Drawing Figs.

[52] U.S. Cl. ................................................. 137/556,
62/223, 236/92, 251/118, 251/205
[51] Int. Cl. ..................................................... F16k 3/02,
F25b 41/04

[50] Field of Search........................................ 62/223;
137/82 (US), 637.2 (US), 637.3; 251/121, 205

[56] References Cited
UNITED STATES PATENTS
| 990,744 | 4/1911 | Jones ............................ | 137/637.2X |
| 1,388,704 | 8/1921 | Griffin .......................... | 251/121 |

*Primary Examiner*—William F. O'Dea
*Assistant Examiner*—Richard Gerard
*Attorney*—Roberts, Cushman & Grover

ABSTRACT: A proportioning valve for use in a control system for varying the range of control and the level of operation within the range.

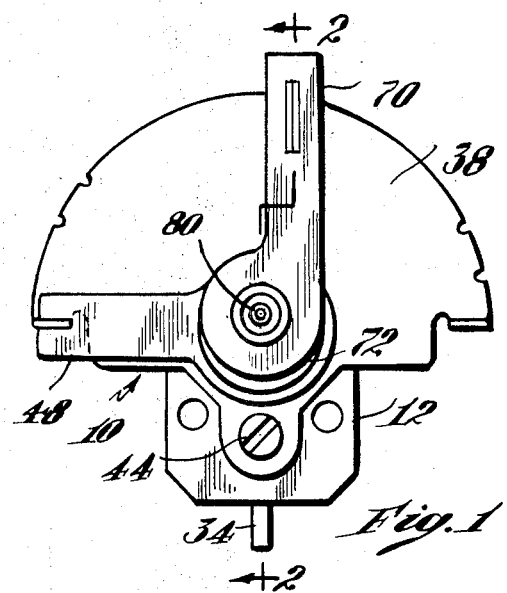
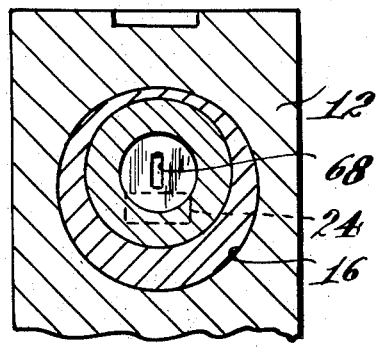
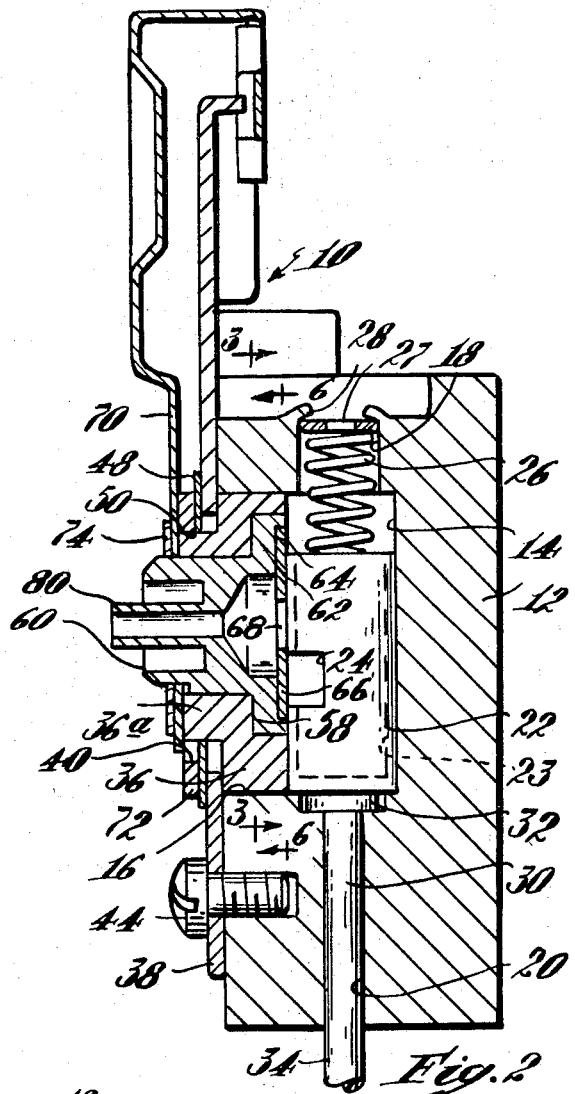
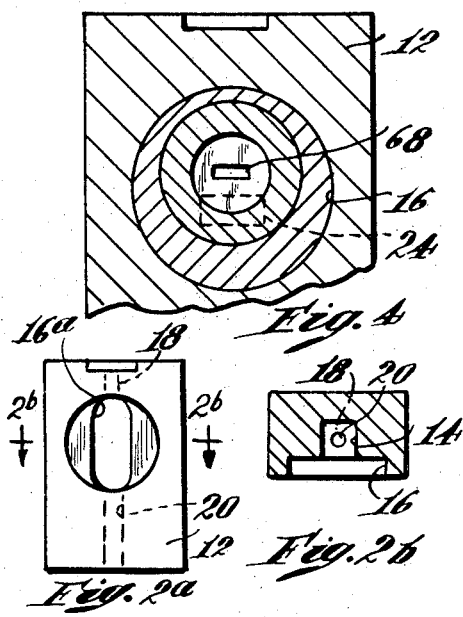
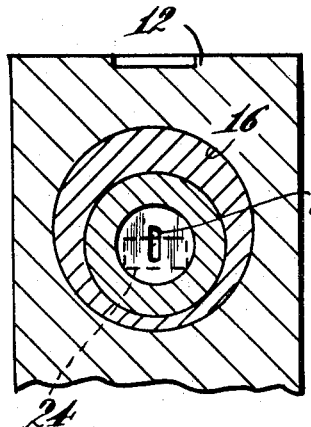
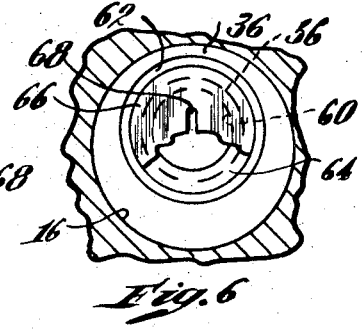

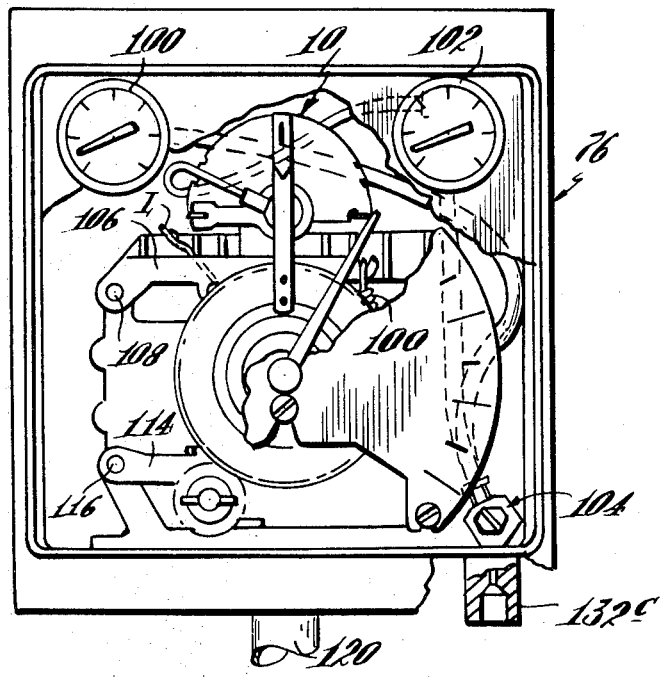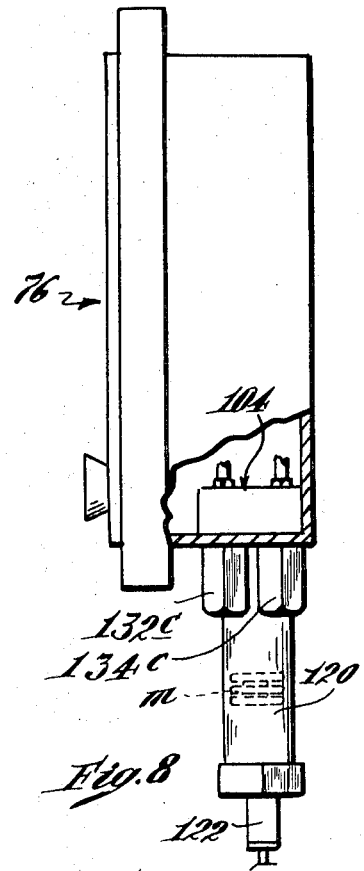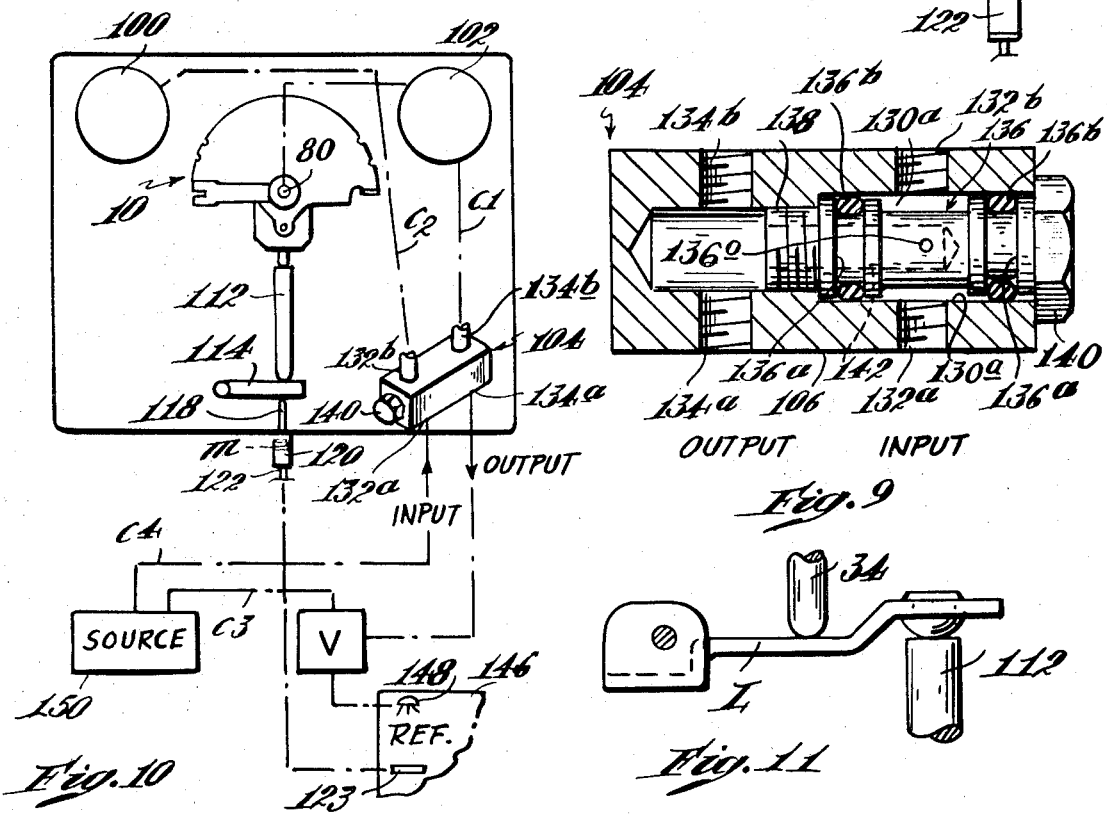

3,575,207

1

PROPORTIONING VALVE

BACKGROUND OF THE INVENTION

Proportioning valves and their use are not new; however, that shown herein is considered to embody in the system in which it is used a greater flexibility than has heretofore been possible and especially to enable obtaining, by adjustment, different ranges of operation and in each range different levels of operation; to enable controlling standard 3—15 p.s.i. signal pressures; to provide control which is proportional to a measured temperature; and to provide control capable of restoring balance to a system following a load change. Other advantages are to provide a proportional valve by means of which the output may be increased or decreased throughout the range of operation selected whether small or large thus insuring stability and eliminating undesirable cycling.

SUMMARY

According to the invention the proportioning valve comprises a valve block containing a chamber with inlet and outlet openings in communication therewith, a valve element in the chamber containing a passage, one end of which confronts the inlet opening and the other end of which confronts the outlet opening, said valve element being movable in the chamber to move the one end transversely of the inlet opening, said other end remaining constantly in communication with the outlet opening throughout movement of the valve element, an orifice plate containing an orifice of elongate configuration, and means supporting the orifice plate over the inlet opening for movement transversely thereof and for rotation about an axis at right angles thereto. The valve chamber is elongate with the inlet opening in one of the longitudinal sides and the outlet opening in one of the ends, the valve element is movable lengthwise of the chamber, contains a port in one side and a port in one end connected to each other through the element, and there is means yieldably holding the valve element at the end of the chamber opposite the ported end. The valve is movable in opposition to the spring to bring the port in its side into varying degrees of registration with the inlet opening. A circular recess is provided concentric with the inlet opening and an annular support is mounted therein for rotation about an axis at its center perpendicular to the plane of the inlet opening and at right angles to the direction of movement of the valve element. The annular support contains an eccentric opening in which is mounted a manifold and mounts the orifice plate through which the pressure to be proportioned is transmitted to the valve chamber. The annular support provides for rotation of the orifice and the manifold provides for displacement of the orifice.

The proportioning valve may be employed in a system for controlling the temperature in a refrigeration chamber to which refrigerating fluid is supplied from a source through a conductor extending from the source to the chamber. When used in such a system a control valve is interposed in the conductor and the proportioning valve is connected to the control valve. The proportioning valve embodies an actuator and a motor operable to effect actuation in response to changes in the ambient condition in the chamber. Use of the proportioning valve in the refrigeration system referred to is by way of illustration only since it can be used in any system for the purpose of providing control proportional to a measured temperature and/or of restoring balance to a system which becomes unbalanced.

The invention will now be described in greater detail with reference to the accompanying drawings wherein:

FIG. 1 is a front elevation of the proportioning valve;

FIG. 2 is a section taken on the line 2—2 of FIG. 1 to much larger scale;

FIG. 2a is an elevation, to much smaller scale, of the proportioning valve block with the valve element omitted;

FIG. 2b is a section taken on the line 2b—2b of FIG. 2;

FIG. 3 is a section taken on the line 3—3 of FIG. 2 with the orifice in the orifice plate in a vertical position;

2

FIG. 4 is a corresponding view with the orifice in the orifice plate in a horizontal position;

FIG. 5 is a corresponding view with the orifice displaced downwardly from the positions shown in FIGS. 3 and 4;

FIG. 6 is a view taken on the line 6—6 of FIG. 2;

FIG. 7 is a front elevation of the indicator instrument in which the proportioning valve is mounted embodying pressure indicators and a restrictor;

FIG. 8 is a side elevation of the instrument shown in FIG. 7 broken away in part to show the restrictor;

FIG. 9 is a section through the restrictor to larger scale;

FIG. 10 diagrammatically shows the proportioning valve as used in a pressure system for controlling pressure fluid supplied from a source to a refrigerating chamber; and FIG. 11 is a fragmentary elevation of a modification in which the proportioning valve is relocated relative to the transmitter rod to provide a different ratio than that shown in FIGS. 7 and 10.

Referring specifically to FIGS. 1 to 6, inclusive, the proportioning valve 10 comprises a valve block 12 square in right section containing longitudinally thereof a valve chamber 14 which is of flat oval right section. At one side of the valve block there is a circular recess 16, the center of which coincides with the longitudinal axis of the block. The bottom of the recess intersects one side of the valve chamber 14 thereby providing an opening 16a in communication with the valve chamber. The valve block also contains axially disposed openings 18 and 20, the opening 18 extending from one end of the valve chamber through the end of the valve block and the opening 20 extending from the other end of the valve chamber through the other end of the block. A valve element 22 is mounted in the valve chamber for sliding movement longitudinally thereof, the element having an exterior cross section corresponding to the interior of the valve chamber, being hollow so that it has a longitudinally extending interior passage 23, open at the one end, that is at the end confronting the opening 18, closed at the other end, that is the end confronting the opening 20 and provided with a side opening or port 24 which confronts the opening 16a in the block. The opening or port 24 is preferably of rectangular configuration with its long axis situated transversely with respect to the opening 16a. A coiled spring 26 is mounted in the opening 18 with one end engaged with a washer 27 set into the opening and confined therein by spurs 28 and with its other end engaged with the end of the valve element and operates to hold the valve element displaced toward the end of the chamber containing the opening 20. An actuator rod 30 is mounted in the opening 20 with its inner end 32 engaged with the valve element and its outer end 34 protruding from the block.

An annular support 36 provided with a hub 36a is rotatably mounted in the circular recess 16 against the bottom and is held therein by a flat plate 38 containing a circular opening 40 through which the hub 36a projects. The flat plate 38 is fastened by means of screws 44 to the face of the valve block and in addition to holding the annular support in place constitutes the scale plate and as shown in FIG. 1 is semicircular. An arm 48 is mounted on the hub parallel to the plate 38 and contains a noncircular hole 50 adapted to fit onto a noncircular portion 52 of the hub, so that by rotation in the plane of the face of the scale plate 38 the annular support 36 may be rotated about an axis perpendicular to the opening in the valve block.

The annular support 36 contains an eccentrically located circular hole 56, at the inner end of which there is a concentric, annular axially recessed shoulder 58. A hollow manifold 60 of circular cross section, provided with a radial flange 62 at one end is rotatably mounted in the eccentric opening 56 in the annular support 36 with its flange 62 seated in the recess against the shoulder 58. The flange 62 in turn contains a shallow annular recess 64 in which there is mounted a flat circular orifice plate 66 containing a narrow elongate orifice 68. An arm 70 is mounted on the manifold with a washer 72 between it and the arm 48 and with a retaining washer 74 at its outer side. The arm 70 also contains a noncircular opening cooperable with a noncircular portion of the manifold so that rotation of the arm 70 in a plane parallel to the face of the scale plate 38 enables rotating the manifold.

The manifold 60 contains an integral, concentrically located tube 80 adapted to be connected to a source of pressure, as will appear hereinafter, through which pressure fluid is adapted to be admitted to the proportioning valve.

As thus constructed, it is apparent that by rotating the arm 48 and hence the annular support 36, the manifold 60 may be moved in a plane parallel to the face of the valve block containing the opening 16a to adjust the position of the orifice 68 in the orifice plate relative to the port 24 in the valve element and that by rotating the arm 70 the manifold may be rotated about an axis perpendicular to the plane of the opening 16a to change the angular position of the orifice 68 relative to the port 24 in the valve element. These adjustments provide for increasing and decreasing the temperature band and pressure action of the instrument and of controlling the level of the temperature in any given range.

When the arm 48 is in the horizontal position to the right, the output pressure will be increased by reason of the fact that the actuating valve plunger 34 can move the valve element 22 to a position to cover the orifice 68. When the arm 48 is in the horizontal position to the left, the output pressure will be decreased by reason of the fact that the actuating valve plunger 34 can move the valve element 22 to a position to uncover the orifice 68.

When the arm 70 is in the far right position, the orifice 68 is located, as shown in FIG. 3, giving the widest temperature range. When the arm 70 is to the far left, the orifice 68 is located, as shown in FIG. 4, giving a minimum temperature band. In other words, when the arm is set for a maximum band it will take a greater stoke of the valve plunger for the system to go from minimum to maximum pressure and thus a wider temperature band. The adjustment level permits adjustment of the throttling range or proportional band to produce stability and eliminates undesirable cycling in the system.

An important feature of the structure resides in the positioning of the valve element 22 in the valve block in relation to the orifice 68 in the orifice plate. When the valve element completely covers the orifice, pressure builds up at an output fitting, which will be described hereinafter, in the form of a maximum output pressure or signal. When the valve element 22 does not cover the orifice 68 or when the narrow dimension of the port 24 in the valve element coincides with the orifice 68 in the orifice plate, pressure escapes into the valve element and through it and the opening 18 in the valve block to the atmosphere thus creating a minimum output pressure. Partial registration of the port 24 and the orifice 68 in various positions of the orifice plate and valve element provides for output pressures between the minimum and maximum values.

As illustrated in the drawings thus far described, the proportioning valve 10 is used in conjunction with an indicator and control instrument 76 (FIG. 7), which forms the subject matter of a pending application, modified by installation of the proportioning valve 10 plus two indicators 100 and 102, a restrictor 104 and connecting tubing as will be related hereinafter. In FIG. 7 the proportioning valve 10 is mounted on an arm 106 pivotally supported at 108 and yieldably held down by a spring 110 against the upper end of a transmitter rod 112, the lower end of which is seated in an arm 114 pivotally supported at 116. The arm 114 rests on the upper end of a rod 118, extending axially from a housing 120 in which there is an expandable bellows-type motor $m$, expansion of which is brought about by a volatile fluid conducted to it through a capillary tube 122, one end of which is connected to a motor and the other end of which has connected to it a bulb 123 containing a volatile fluid. Expansion of the expandable motor $m$ accordingly through the aforesaid linkage will displace the actuator rod 30 upwardly in the value block 12 and thus move the valve element relative to the orifice in the orifice plate.

The restrictor 104 is supported in the instrument case at the lower right-hand corner as shown in FIGS. 7 and 8, and comprises (FIG. 9) a block 106 containing a longitudinally extending passage 130 closed at one end and open at the other. Diametrically disposed ports 132a, 132b and 134a, 134b are provided adjacent each end which are in communication with the passage 130. A plug 136 is mounted in the longitudinal passage, the inner end having a screw-threaded portion 138 for engagement with threads within the passage to hold the element in place, and a head 140 by means of which it is screwed into place or unscrewed for removal. The plug 136 contains a longitudinal passage 142, the end adjacent the head being closed and the end adjacent the screw-threaded portion being open. A portion of the plug between the head and the threaded end is turned down to a smaller diameter than the passage 130 so that there is an annular chamber 130a surrounding that portion of the plug to which the ports 132a, 132b connect. The plug at opposite ends of the reduced portion is provided with annular grooves 136a in which are mounted sealing rings 136b. The portion of the plug between the sealing rings contains a small diameter orifice 136°. An inlet nipple 132c mounted externally of the case and extending through a hole therein is screwed into the port 132a and an outlet nipple 134c also mounted externally of the case and extending through a hole therein is screwed into the port 134a.

The proportioning valve 10 is connected by a flexible conductor C1 to the port 134b so that the input flow through the orifice 136° is admitted to the proportioning valve and in accordance with the setting of the latter controls the output through the port 134a. The indicator 100 is connected by a conduit C2 directly to the port 132b and hence registers the pressure at the source. The indicator 102 is interposed in the conductor C1 and hence registers the output pressure.

The proportioning valve, restrictor and indicator are all embodied in the structure of the control instrument.

The composite structure may be employed, as herein illustrated (FIG. 10), in a refrigeration system for supplying refrigerant to a refrigeration chamber 146; for example, for supplying liquid carbon dioxide to a spray head 148 at the top of the chamber. A source 150 of refrigerant is connected to the chamber by a conductor C3 in which there is interposed a control valve V. The source 150 is also connected by a conductor C4 to the input nipple 132a of the restrictor 104. The bulb 123 is placed in the refrigeration chamber 146 and is connected by the capillary tube 122 to the motor $m$.

The setting of the proportioning valve 10 will control the actuation of the valve V so as to supply refrigerant to the chamber in accordance with the requirements sensed by the bulb 123 and enables adjusting the total range of temperature which may be obtained and the level of temperature within the range in which the valve V will be opened or closed. Operation is initiated by the bulb 123 when the temperature in the refrigeration chamber rises above a predetermined limit to expand the motor $m$, raise the transmitter rod 112 and the actuator rod 30. The actuator rod moves the valve element 22 in the chamber 14 relative to the orifice 68 and depending upon its setting will build up back pressure in proportion to the setting such as to open the valve V thus allowing fluid from the source to flow to the spray head 148 within the refrigeration chamber. When a predetermined low temperature is reached the motor contracts, allowing the actuator 30 to move in the opposite direction thereby increasing the valve opening, decreasing the back pressure and hence closing the valve V.

As related above and as shown in FIGS. 6 and 7, the proportioning valve is mounted directly on the carrier arm 106 above the transmitter rod 112 of the control instrument thus providing a 1 to 1 ratio between the movement of the transmitter rod and the actuator rod. The proportioning valve may, however, be mounted to the left of the transmitter rod (FIG. 11) to provide, for example, a 6 to 1 ratio. This would enable obtaining a greater proportioning range for the same stroke of the valve element. The transmitter rod 112 actuates a compounding level L which in turn actuates the actuator rod 30 of the valve element 22. As shown in FIG. 7, the compounding level L can be pivoted to an out-of-the-way position when the 1 to 1 ratio is used and yet can be easily rotated to an operative position for use when a 6 to 1 ratio is desired.

It should be understood that the present disclosure is for the purpose of illustration only and that this invention includes all modifications and equivalents falling within the scope of the appended claims.

We claim:

1. A proportioning valve comprising a valve block containing a chamber with inlet and outlet openings in communication therewith, a valve element in the chamber containing a passage, one end of which is adapted to communicate with the inlet opening and the other end of which is adapted to communicate with the outlet opening, said valve element being movable in the chamber to move said one end transversely of said inlet opening, said other end remaining constantly in communication with said outlet opening throughout movement of the valve element, an orifice plate containing an orifice of elongate configuration in communication with said inlet opening, and means supporting the orifice plate over said inlet opening and in valving relation with said valve element for movement transversely of the axis of the inlet opening and for rotation about said axis.

2. In a control system embodying a proportioning valve having a variable orifice, according to claim 1, a source of fluid pressure and a restrictor having an inlet port to which fluid from the source is connected, said restrictor having two ports in communication with the fluid pressure in the restrictor, one of which is connected to said proportioning valve so that adjustment of said proportioning valve varies the pressure at the other port.

3. In a control system according to claim 2 wherein the restrictor comprises a block containing a longitudinal passage closed at one end and open at the other, diametrically arranged ports near each end of the passage, a threaded plug screwed into the open end of the passage and extending longitudinally toward the closed end, said plug containing an axial passage closed at the end adjacent the open end of the block and open at the other end, said plug having a portion of smaller diameter than the interior of the passage in the block and in communication with the ports at that end of the block, and a small diameter orifice extending through the reduced portion into the passage within the plug.

4. A proportioning valve comprising a valve block containing an elongate chamber with an inlet opening in one of the longitudinal sides and the outlet opening in one of the ends, an elongate valve element in the chamber containing a port in one side and a port in one end, said ports being connected through the valve element and said valve element being movable in the chamber to move the port at the side relative to the inlet opening, means yieldably holding the valve element at the other end of the chamber in which position the port in its side is displaced relative to the inlet opening in the chamber, means operable to move the valve element in the chamber to bring said port in the side into varying degrees of registration with the inlet opening in the chamber, an orifice plate in valving relation with said valve element and containing an elongate orifice in communication with said inlet opening, and means mounting the orifice plate for movement across said inlet opening in the chamber and for rotation about the axis of said inlet opening.

5. A proportioning valve comprising a valve block containing an elongate chamber, a circular opening entering the chamber from one side and an opening entering the chamber from one end, an elongate valve element in the chamber movable longitudinally therein relative to the circular opening, said valve element containing ports at one side and at one end which are connected through the valve element and adapted to be placed in communication with said side opening, an annular support rotatably mounted in said side opening for rotation about the axis of said side opening and perpendicular to said circular opening, said annular support containing an eccentric circular opening through it, a hollow manifold of circular cross section mounted in the annular support with one end adjacent the chamber for rotation about an axis at its center parallel to the axis of the side opening, and an orifice plate containing an elongate orifice in communication with said side opening and mounted at the inner end of the manifold for rotation therewith and in valving relation with said valve element, rotation of the manifold effecting rotation of the orifice relative to the port in the side of the valve element and rotation of the annular support effecting movement of the orifice transversely of the port in the side of the valve element.

6. A proportioning valve according to claim 5, wherein the chamber is rectangular in cross section and the valve element is of corresponding rectangular section so as to be slidable in the chamber, said valve element containing an axial passage open at one end and closed at its other end, said open end constituting the port at said one end and said port at the side being situated intermediate the ends and being transversely elongate.

7. A proportioning valve according to claim 5, comprising an arm fixed to the annular support for effecting its rotation about its axis to vary the range of temperature and an arm fixed to the manifold for effecting its rotation about its axis to vary the temperature level within a given temperature range.

8. A proportioning valve according to claim 5, wherein a spring is mounted in the chamber between the end containing the outlet opening and the port at the end of the valve element, said spring normally holding the valve element engaged with the opposite end of the chamber, said block containing at its opposite end an opening coinciding with the longitudinal axis of the valve element, and a rod mounted in the opening with one end engaged with the valve element and the other end protruding from the block.

9. A proportioning valve according to claim 5, comprising an arm mounted on the annular support radial to its axis for effecting rotation of the annular support about its axis and an arm on the manifold radial to its axis for effecting rotation of the manifold about its axis.

10. A proportioning valve according to claim 9, wherein each arm contains a noncircular opening adapted to fit into a correspondingly noncircular portion of the annular support and manifold respectively.

11. A proportioning valve according to claim 9, comprising a scale associated with each arm, each scale being calibrated to indicate the relative positions of the openings in the valve element and the orifice plate to each other.

12. A proportioning valve according to claim 5, wherein a flexible conductor is connected to the manifold through which pressure is admitted to the manifold.